United States Patent
Ravi et al.

(10) Patent No.: US 9,535,826 B2
(45) Date of Patent: Jan. 3, 2017

(54) AUTOMATIC COMMUNICATION AND OPTIMIZATION OF MULTI-DIMENSIONAL ARRAYS FOR MANY-CORE COPROCESSOR USING STATIC COMPILER ANALYSIS

(71) Applicant: NEC Laboratories America, Inc., Princeton, NJ (US)

(72) Inventors: Nishkam Ravi, Mountain View, CA (US); Yi Yang, Edison, NJ (US); Srimat Chakradhar, Manalapan, NJ (US); Bin Ren, Kennewick, WA (US)

(73) Assignee: NEC Corporation (JP)

( * ) Notice: Subject to any disclaimer, the term of this patent is extended or adjusted under 35 U.S.C. 154(b) by 411 days.

(21) Appl. No.: 14/293,667

(22) Filed: Jun. 2, 2014

(65) Prior Publication Data

US 2015/0067225 A1 Mar. 5, 2015

Related U.S. Application Data

(60) Provisional application No. 61/871,966, filed on Aug. 30, 2013.

(51) Int. Cl.
*G06F 12/02* (2006.01)
*G06F 13/30* (2006.01)
(Continued)

(52) U.S. Cl.
CPC ............ *G06F 12/0207* (2013.01); *G06F 8/41* (2013.01); *G06F 8/443* (2013.01); *G06F 8/51* (2013.01);
(Continued)

(58) Field of Classification Search
CPC ............................ G06F 12/0207; G06F 13/30
See application file for complete search history.

(56) References Cited

U.S. PATENT DOCUMENTS

| | | | |
|---|---|---|---|
| 8,997,114 B2* | 3/2015 | Zhou | G06F 9/544 345/520 |
| 2010/0118041 A1* | 5/2010 | Chen | G06F 9/544 345/542 |

(Continued)

OTHER PUBLICATIONS

Jablin, T., et al. "Dynamically Managed Data for CPU-GPU Architectures" 10th Annual IEEE/ACM International Symposium on Code Generation and Optimization. Mar. 2012. (10 Pages).

(Continued)

*Primary Examiner* — Ilwoo Park
*Assistant Examiner* — Christopher a Daley
(74) *Attorney, Agent, or Firm* — Joseph Kolodka (57) ABSTRACT

There are provided source-to-source transformation methods for a multi-dimensional array and/or a multi-level pointer for a computer program. A method includes minimizing a number of holes for variable length elements for a given dimension of the array and/or pointer using at least two stride values included in stride buckets. The minimizing step includes modifying memory allocation sites, for the array and/or pointer, to allocate memory based on the stride values. The minimizing step further includes modifying a multi-dimensional memory access, for accessing the array and/or pointer, into a single dimensional memory access using the stride values. The minimizing step also includes inserting offload pragma for a data transfer of the array and/or pointer prior as at least one of a single-dimensional array and a single-level pointer. The data transfer is from a central processing unit to a coprocessor over peripheral component interconnect express.

17 Claims, 6 Drawing Sheets

(51) Int. Cl.
*G06F 9/45* (2006.01)
*G06F 12/00* (2006.01)

(52) U.S. Cl.
CPC ............ *G06F 12/023* (2013.01); *G06F 13/30* (2013.01); *G06F 2212/1016* (2013.01)

(56) References Cited

U.S. PATENT DOCUMENTS

2012/0202515 A1* 8/2012 Hsu ................ G06Q 10/087
455/456.1
2014/0049550 A1* 2/2014 Chen ................ G06F 9/544
345/542

OTHER PUBLICATIONS

Jablin, T., et al. "Automatic CPU-GPU Communication Management and Optimization" Proceedings of the 32nd ACM SIGPLAN Conference on Programming Language Design and Implementation. Jun. 2011. (10 Pages).

Pai, S., et al. "Fast and Efficient Automatic Memory Management for GPUS Using Compiler-Assisted Runtime Coherence Scheme" International Conference on Parallel Architectures and Compilation Techniques. Sep. 2012. (10 Pages).

Saha, B., et al. "Programming Model for a Heterogeneous X86 Platform" Proceedings of the 2009 ACM SIGPLAN Conference on Programming Language Design and Implementation, PLDI 2009. Jun. 2009. pp. 431-440.

\* cited by examiner

AUTOMATIC COMMUNICATION AND OPTIMIZATION OF MULTI-DIMENSIONAL ARRAYS FOR MANY-CORE COPROCESSOR USING STATIC COMPILER ANALYSIS

RELATED APPLICATION INFORMATION

This application claims priority to provisional application Ser. No. 61/871,966 filed on Aug. 30, 2013, incorporated herein by reference.

BACKGROUND

Technical Field

The present invention relates to signal communication, and more particularly to automatic communication and optimization of multi-dimensional arrays for a many-core coprocessor using static compiler analysis.

Description of the Related Art

Data transfers between a central processing unit (CPU) and many-core processors (e.g., Intel® many-core coprocessors) over peripheral component interconnect express (PCIe) are plagued by numerous problems including the lack of an automatic and efficient method of performing the same. For such many-core coprocessors, the only existing solution is the use of virtual shared memory. However, this existing prior art solution is a runtime coherence mechanism with very high data transfer overheads and unsatisfactory performance.

SUMMARY

These and other drawbacks and disadvantages of the prior art are addressed by the present principles, which are directed to automatic communication and optimization of multi-dimensional arrays for an Intel many-core coprocessor using static compiler analysis.

According to an aspect of the present principles, there is provided a source-to-source transformation method for at least one of a multi-dimensional array and a multi-level pointer for a computer program. The method includes minimizing a number of holes for variable length elements for a given dimension of the at least one of a multi-dimensional array and a multi-level pointer using stride values included in stride buckets. The minimizing step includes modifying memory allocation sites, for the at least one of the multi-dimensional array and the multi-level pointer, to allocate memory based on the stride values. The stride values include at least two stride values. The minimizing step further includes modifying a multi-dimensional memory access into a single dimensional memory access using the stride values. The multi-dimensional memory access is for accessing the at least one of the multi-dimensional array and the multi-level pointer. The minimizing step also includes inserting offload pragma for a data transfer of the at least one of the multi-dimensional array and the multi-level pointer prior as at least one of a single-dimensional array and a single-level pointer. The data transfer is from a central processing unit to a coprocessor over peripheral component interconnect express.

According to another aspect of the present principles, there is provided a source-to-source transformation method for at least one of a multi-dimensional array and a multi-level pointer for a computer program. The method includes replacing an original set of memory allocation statements for the at least one of the multi-dimensional array and the multi-level pointer by a single memory allocation statement that allocates a memory region of a given size based on length information parsed from the original set of memory allocation statements. The method further includes resetting pointers, for both a central processing unit and a coprocessor, that retain original memory accesses to the at least one of the multi-dimensional array and the multi-level pointer based on the length information. The method also includes generating pragma offload statements for a data transfer from the processor to the coprocessor over peripheral component interconnect express. The method additionally includes transferring an amount of memory for the at least one of the multi-dimensional array and the multi-level pointer. The transferring step is performed to collectively transfer all components of the at least one of a multi-dimensional array and a multi-dimensional pointer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to automatic communication and optimization of multi-dimensional arrays and/or multi-level pointers for a many-core coprocessor using static compiler analysis. In an embodiment, the present principles are specifically directed to an Intel® many-core coprocessor. However, given the teachings of the present principles provided herein, one of ordinary skill in the art can readily extent such teachings to other many-core coprocessors, while maintaining the spirit of the present principles.

Advantageously, the present principles solve the problem of automatically and efficiently orchestrating data transfers between CPU and Intel many-core coprocessors over PCIe. In an embodiment, the present principles solve this problem for multi-dimensional arrays and multi-level pointers.

In an embodiment, the present principles solve the aforementioned problem using pure static compiler analysis and, therefore, do not incur runtime overheads like in the prior art. In an embodiment, the proposed approach involves a set of source-to-source transformations. This is the only compile-time solution for automatically handling complex memory accesses for many-core coprocessors such as Intel® many-core coprocessors (e.g., Many Integrated Core (MIC)/Xeon® Phi). The present principles also improve the coherence mechanism used in virtual shared memory protocol. Accordingly, as described herein with respect to multi-dimensional arrays and multi-level pointers, we perform source-to-source transformations in order to transform the multi-dimensional arrays and multi-level pointers into single-dimensional arrays and single-level pointers, respectively.

Figure 1:
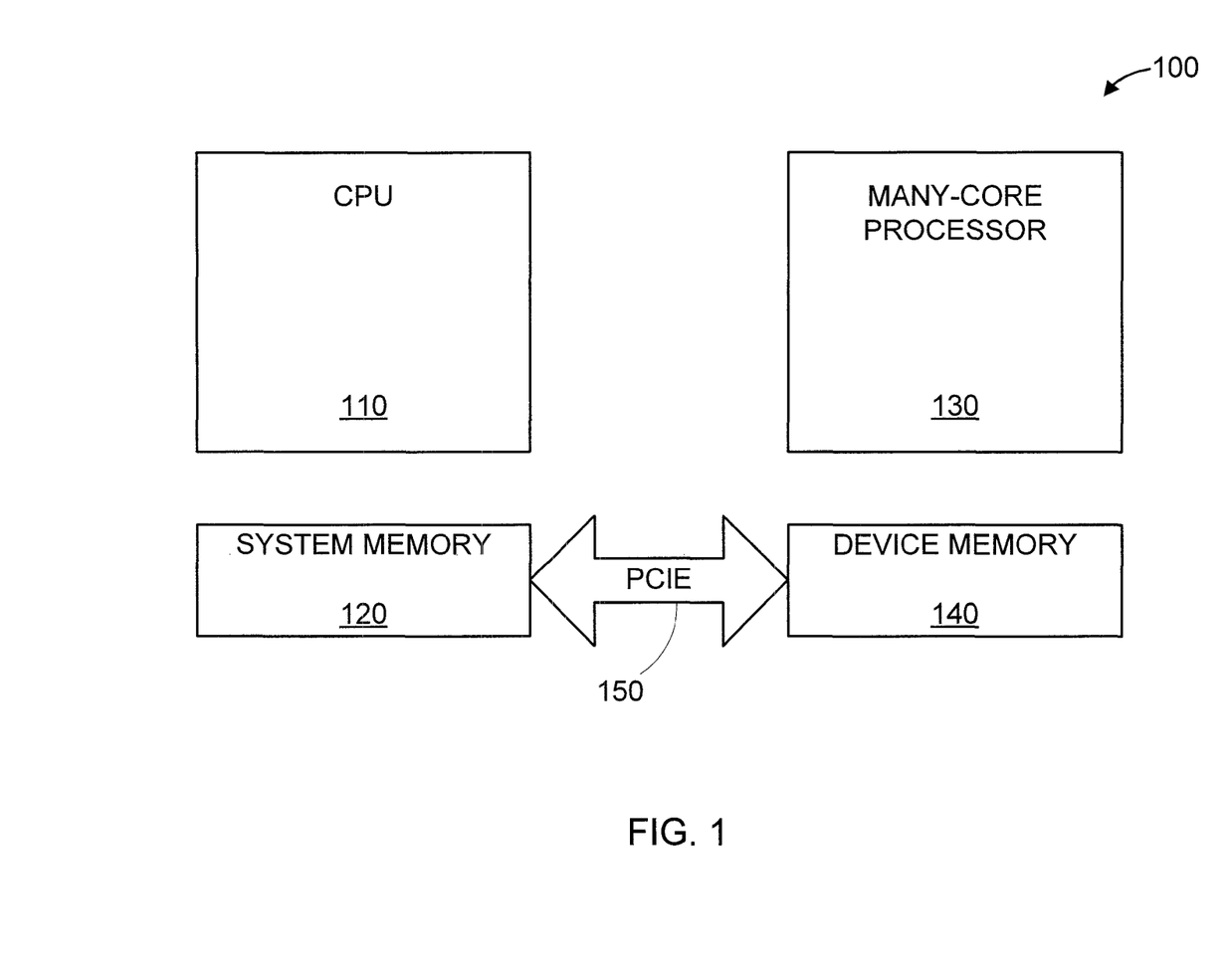
FIG. 1 shows an exemplary computing environment to which the present principles can be applied, in accordance with an embodiment of the present principles.

FIG. 1 shows an exemplary computing environment 100 to which the present principles can be applied, in accordance with an embodiment of the present principles. The environment 100 includes a central processing unit (hereinafter interchangeably referred to as "many-core coprocessor") 110, a system memory 120, a many-core processor 130, a device memory 140, and a PCIE bus 150 connecting the system memory 120 and the device memory 140.

One of the many attendant contributions of the present principles is two separate source-to-source transformation methods for automating communication of multi-dimensional arrays between a central processing unit (CPU) and a many-core coprocessor (such as an Intel® many-core coprocessor) over peripheral component interconnect express (PCIe). It is to be appreciated that the source-to-source transformation methods can be performed, for example, by a transcompiler. The transcompiler can be included in, for example, the CPU 110 and/or the many-core processor 130.

A description will now be given of the first transformation method (hereinafter interchangeably referred to as "transformation 1"), in accordance with an embodiment of the present principles.

An advantageous feature of the first transformation method is the use of stride value buckets for minimizing redundant data transfers, and corresponding modifications to the memory allocation sites and memory accesses, as described herein after. The first transformation method attempts to convert multi-dimensional arrays/multi-level pointers into one-dimensional arrays/one-level pointers. Consider A[M][N], which denotes an array labeled A having M rows and N columns, that is an M×N array of memory elements. In an embodiment, memory access: A[i][j] is converted to A[i*N+j], where N is the stride for the first dimension. The stride refers to the number of locations in memory between beginnings of successive array elements measured in units of the size of the array's elements. For variable length dimensions, we choose the maximum length as the stride for that dimension. Consequently, the resulting one-dimensional array has holes (i.e., gaps, that is, unfilled memory locations), which would lead to redundant data transfers between the CPU and the coprocessor. In order to minimize the number of holes, we propose the use of stride-buckets for the first dimension.

Figure 2:
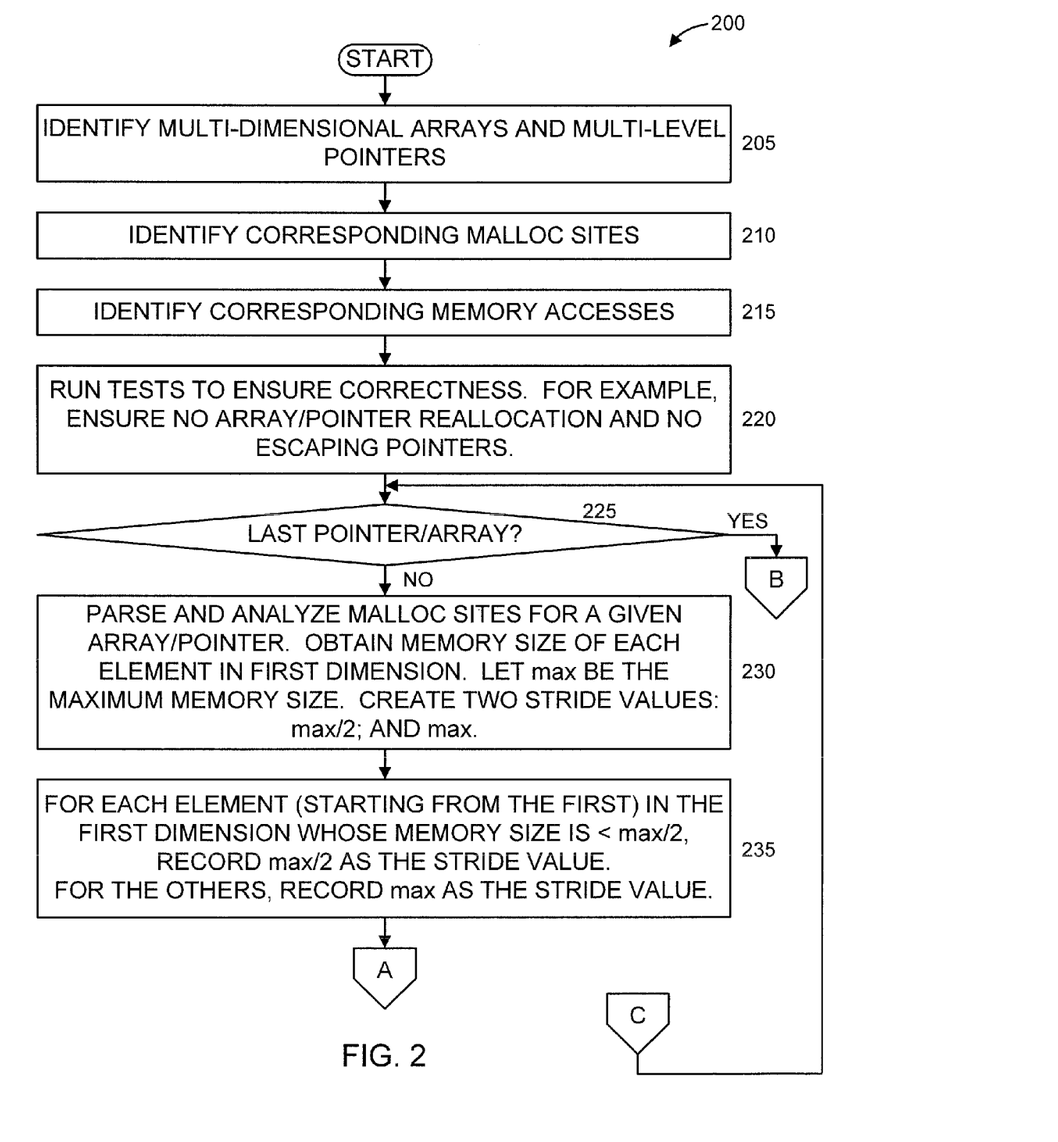
FIGS. 2-3 shows an exemplary first source-to-source transformation method 200 for automating communication of multi-dimensional arrays and/or multi-level pointers between a CPU and a many-core coprocessor over PCIe, in accordance with an embodiment of the present principles.
Figure 3:
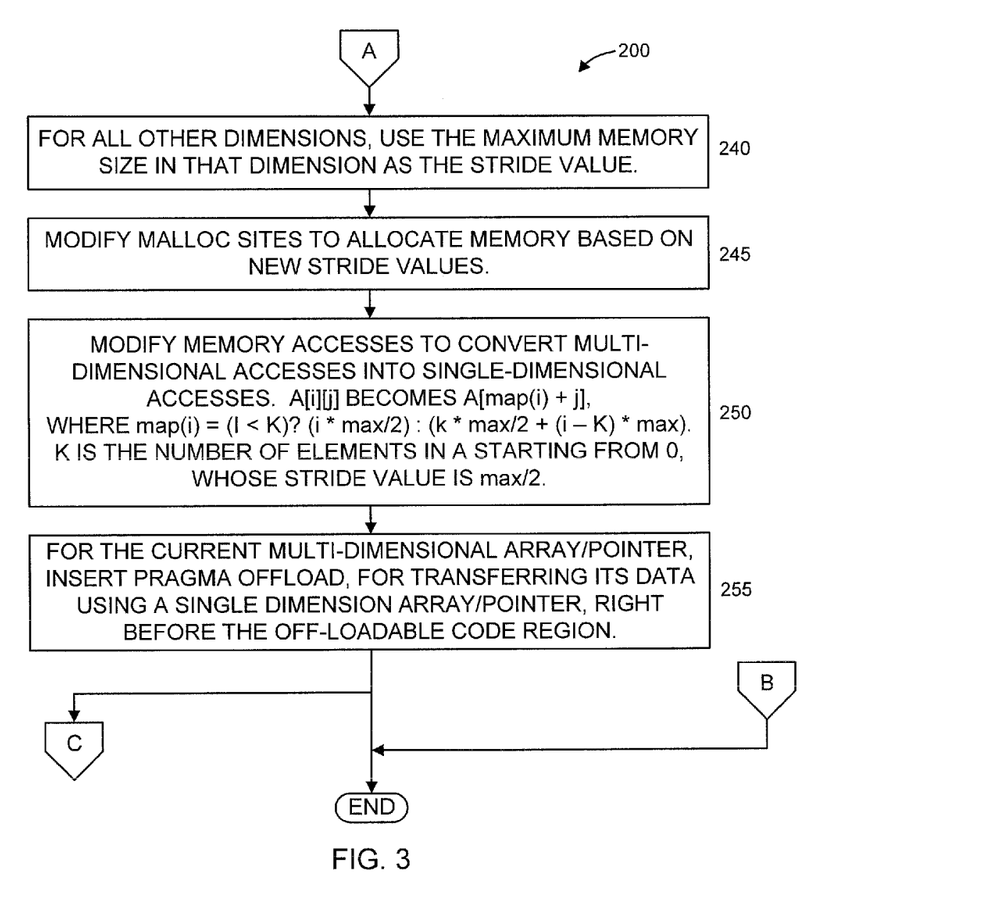

FIGS. 2-3 show an exemplary first source-to-source transformation method 200 for automating communication of multi-dimensional arrays and/or multi-level pointers between a central processing unit (CPU) and a many-core coprocessor over peripheral component interconnect express (PCIe), in accordance with an embodiment of the present principles.

At step 205, identify multi-dimensional arrays and multi-level pointers for a computer program (e.g., including, but not limited to, int A[ ][ ], int ** A, and so forth).

At step 210, identify corresponding memory allocation sites (malloc's).

At step 215, identify corresponding memory accesses (e.g., P=A[i][j]).

At step 220, run a battery of tests to ensure correctness. In an embodiment, step 240 includes making sure that the arrays/pointers are not re-allocated in the computer program and that none of the pointers escapes the computer program.

At step 225, check whether all arrays/pointers have been processed. If all arrays/pointers have been processed, the compiler stops. Otherwise, the method proceeds to step 230 so that the compiler can continue to work on the next array/pointer.

At step 230, parse and analyze malloc sites for a given multi-level pointer/array to obtain the memory size of each element in the first dimension. Let max be the maximum memory size. Create two stride values: max/2 and max, respectively.

At step 235, for each element (starting from the first) whose memory size is less than max/2, record max/2 as the stride value, for others record max as the stride value. In an embodiment, the different stride values are recorded in respective stride buckets.

At step 240, for all other dimensions, use the maximum memory size (for the given dimension) as the stride value.

At step 245, modify the malloc sites to allocate memory based on the new stride values.

At step 250, modify the memory accesses to convert multi-dimensional accesses into a single dimensional access using the correct stride values. A[i][j] will become A[map(i)+j]. map(i)=(i<K)? {i*(max/2)}:{(K*max/2)+(i−K)*max} K is the number of elements in A starting from 0 whose stride value is max/2.

At step 255, for the current multi-dimensional pointer/array, insert pragma offload, for transferring its data (between system memory 120 and device memory 140) using a single dimension array/pointer, right before the off-loadable code region, and then return to step 225 and repeat steps 230-255 for any remaining arrays/pointers. The term "off-loadable code region" refers to a code region in a program whose computations are offloaded and/or otherwise transferred to and performed by a coprocessor instead of having the CPU perform the same. Here, the off-loadable code region pertains to the multi-dimensional array and/or the multi-level pointer.

Regarding step 250, the following example is provided for the sakes of clarity and illustration. A multi-dimensional access A[i][j][k] will become A[(map(i)+j)*Kmax+K], where (map(i)+j) is used to index A[i][j] in step 250. Since we use the maximum size for other dimensions except first two dimensions, the third dimension is accessed by using the maximum size of this dimension, which is Kmax in this case.

A description will now be given of the second transformation method (hereinafter interchangeably referred to as "transformation 2"), in accordance with an embodiment of the present principles.

The second transformation method does not modify memory accesses. The second transformation method only transforms the malloc sites. The second transformation method intends to allocate a large chunk of memory and assign pointers to this memory region such that original memory accesses can be retained. Thus, an advantageous feature of the second transformation method is the modification to malloc sites and the resetting of pointers on both the CPU and coprocessor, such that memory accesses remain unmodified. This preserves code readability and maximizes opportunities for compiler optimization. An additional advantageous feature is the hoisting of data transfer statements outside the parent loop whenever possible in order to optimize data transfers.

Figure 4:
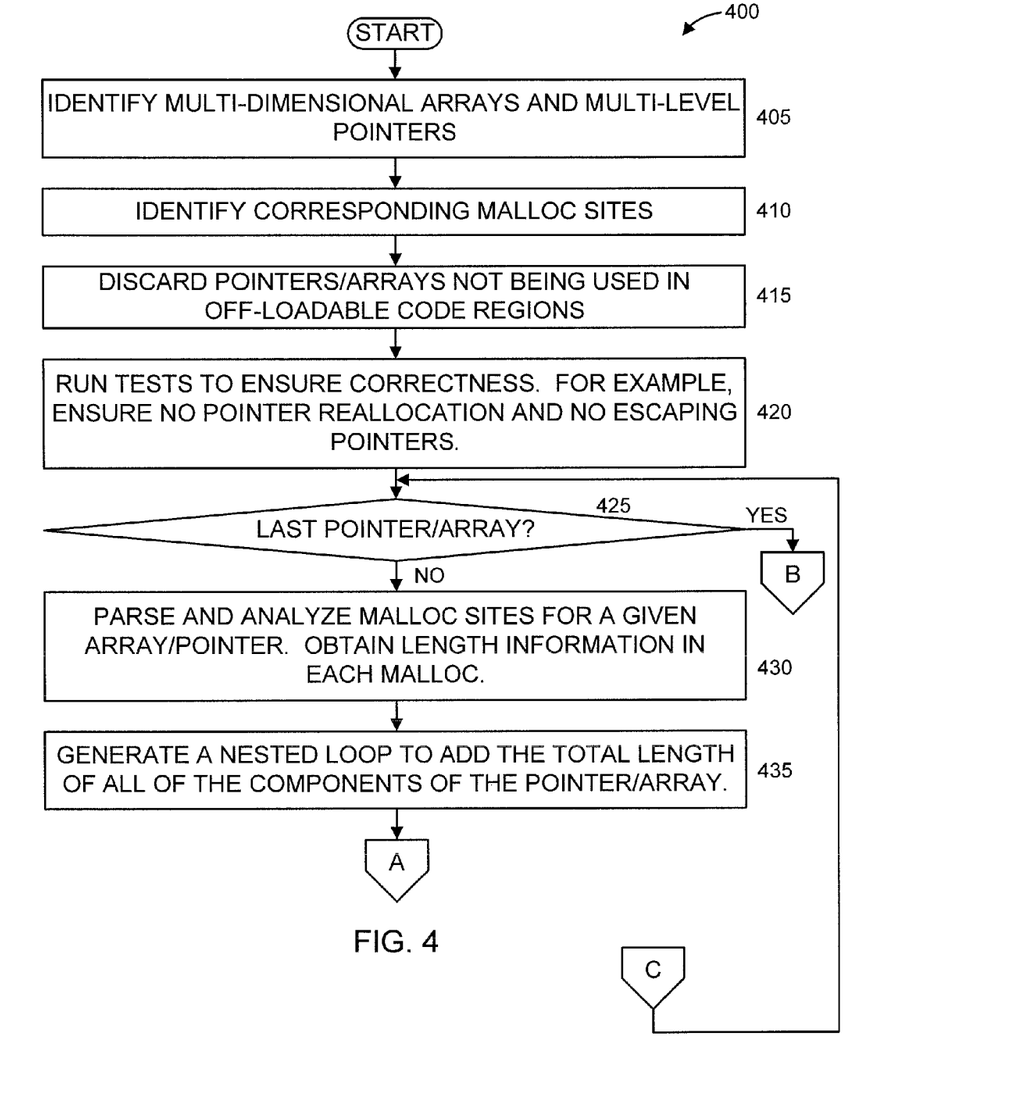
FIG. 4-5 shows an exemplary second source-to-source transformation method 400 for automating communication of multi-dimensional arrays and/or multi-level pointers between a CPU and a many-core coprocessor over PCIe, in accordance with an embodiment of the present principles.
Figure 5:
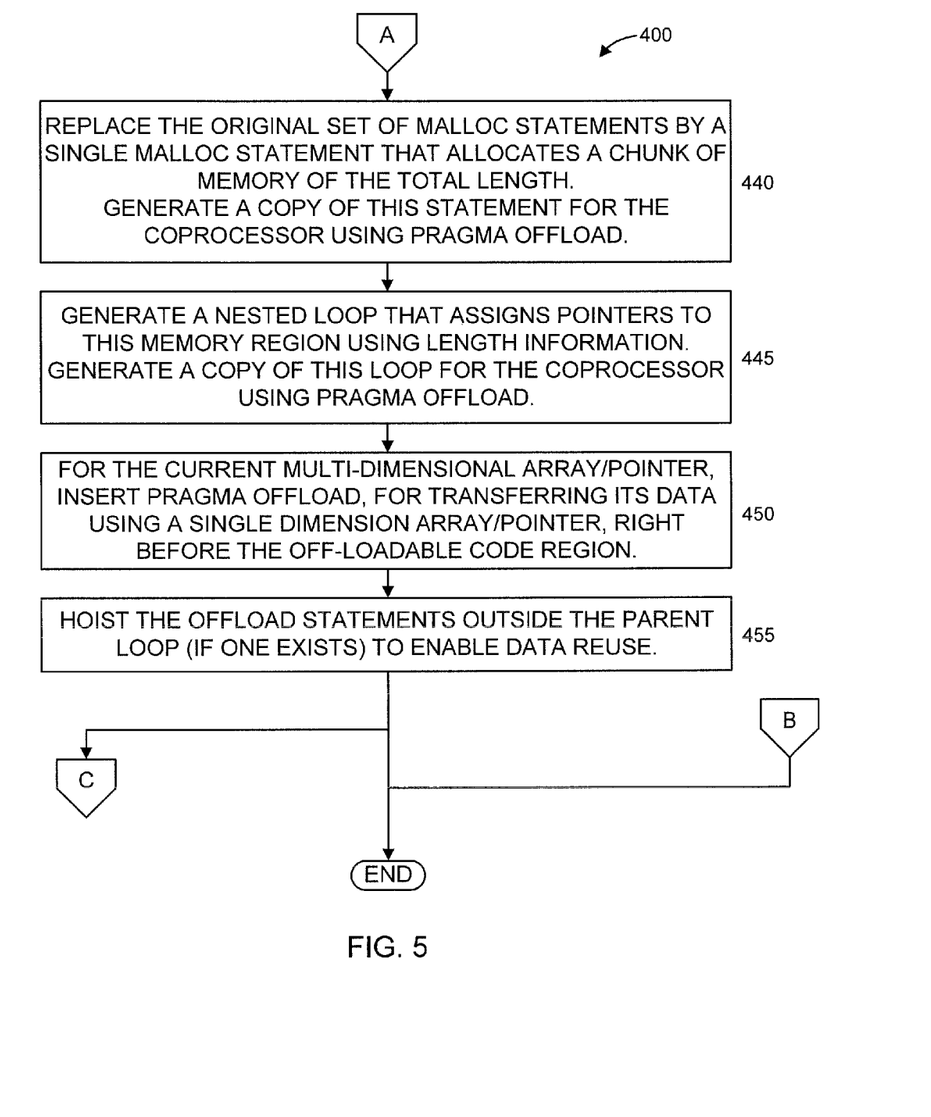

FIGS. 4-5 show an exemplary second source-to-source transformation method 400 for automating communication of multi-dimensional arrays and/or multi-level pointers between a central processing unit (CPU) and a many-core coprocessor over peripheral component interconnect express (PCIe), in accordance with an embodiment of the present principles.

At step 405, identify multi-dimensional arrays and multi-level pointers for a computer program.

At step 410, identify corresponding memory allocation sites.

At step 415, discard pointers/arrays not being used in off-loadable code regions.

At step 420, run a battery of tests to ensure correctness. This includes making sure that the pointers/arrays are not re-allocated in the computer program and that none of the pointers escapes the computer program.

At step 425, check whether all arrays/pointers have been processed. If all arrays/pointers have been processed, the compiler stops. Otherwise, the method proceeds to step 430 so that the compiler can continue to work on the next array/pointer.

At step 430, parse and analyze malloc sites for a given multi-level pointer/array and obtain length/size information in each malloc.

At step 435, generate a nested loop to add the total length of all the components of the pointer/array. In an embodiment, each iteration of this nested loop determines a length of a current component under consideration and adds that length to a sum value that will ultimately equal the total length at the last iteration corresponding to the last component under consideration. The nested loop generated at step 430 is interchangeably referred to herein as the "parent loop".

At step 440, replace the original set of malloc statements by a single malloc statement that allocates a chunk of memory of total length. Generate a copy of this statement for the coprocessor as well, using pragma offload.

At step 445, generate a nested loop that assigns pointers to this memory region based on length information. In an embodiment, each iteration of this nested loop assigns a respective pointer to this memory region. Generate a copy of this loop for the coprocessor as well, using pragma offload.

At step 450, for the current multi-dimensional pointer/array, insert pragma offload, for transferring its data (between system memory 120 and device memory 140) using a single dimension array/pointer, right before the off-loadable code region.

At step 455, hoist the offload statements outside the parent loop (if one exists) to enable data reuse and minimize data transfer overheads, and then return to step 225 and repeat steps 430-455 for any remaining arrays/pointers.

A description will now be given regarding the handling of more complicated data structures.

For more complicated data structures (e.g., graphs/trees), which cannot be handled using the first or the second transformations, _shared clause is generated, so that virtual shared memory can be used to handle such data structures. This approach combines performance with generality.

The coherence mechanism of the virtual shared memory is modified so that dirty bits (i.e., writes) are not tracked. As a result, the synchronization overheads are significantly reduced, at the cost of increased data transfer. Our experiments show that this modified coherence mechanism yields better performance.

A dirty bit is a bit associated with a memory block for indicating whether or not the memory block has been modified. The dirty bit is set when a processor writes to, i.e., modifies, this block of memory. The dirty bit indicates that its associated memory block has been modified and has not yet been saved to storage. When a memory block is to be replaced, its corresponding dirty bit is checked to see if the memory block needs to be written back to secondary memory before being replaced or if it can simply be removed. Dirty bits are used by the CPU.

Figure 6:
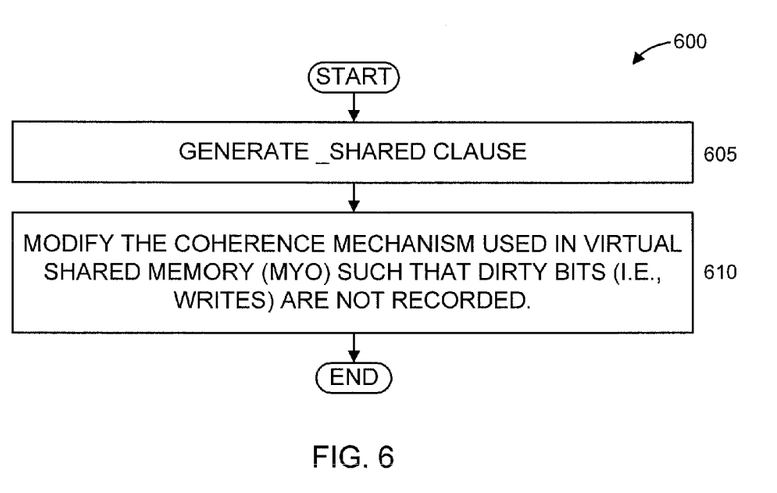
FIG. 6 shows an exemplary method 600 for using virtual shared memory for certain data structures, in accordance with an embodiment of the present principles.

FIG. 6 shows an exemplary method 600 for using virtual shared memory for certain data structures, in accordance with an embodiment of the present principles. The method 600 presupposes that is has already been determined that that the data structure to which the method 600 is to be applied is a complicated data structure that is incapable of being handled by the first transformation (method 200) and the second transformation (method 400). The verifications in steps 220 and 420 determine such lack of capability. For example, if step 220 in FIG. 2 fails, then we cannot apply transformation 1 on the array/pointer. Similarly, if step 420 in FIG. 4 fails, then we cannot apply transformation 2 on the array/pointer.

At step 605, generate _shared clause. At step 610, modify the coherence mechanism used in the virtual shared memory (MYO) such that dirty bits (i.e., writes) are not recorded.

Hence, some of the many attendant advantages of the present principles include, but are not limited to, the following: low complexity; high programmer productivity; and high performance. In an embodiment, the present principles can be included in a "performance and productivity tool" for coprocessors including, but not limited to, the Intel Xeon Phi® coprocessor being integrated in the HPC servers of NEC®.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A source-to-source transformation method for at least one of a multi-dimensional array and a multi-level pointer for a computer program, comprising a transcompiler using static compiler analysis, comprising:
   minimizing a number of holes for variable length elements for a given dimension of the at least one of a multi-dimensional array and a multi-level pointer using stride values included in stride buckets,
   where said minimizing step comprises:
      modifying memory allocation sites, for the at least one of the multi-dimensional array and the multi-level pointer, to allocate memory based on the stride values, the stride values including at least two stride values;
      modifying a multi-dimensional memory access into a single dimensional memory access using the stride values, the multi-dimensional memory access for accessing the at least one of the multi-dimensional array and the multi-level pointer; and
      inserting offload pragma for a data transfer of the at least one of the multi-dimensional array and the multi-level pointer prior as at least one of a single-dimensional array and a single-level pointer, the data transfer being from a central processing unit to a coprocessor over peripheral component interconnect express.

2. The method of claim 1, wherein the offload pragma is inserted at a point in the computer program prior to an off-loadable code region of the program that includes the at least one of the single-dimensional array and the single-level pointer.

3. The method of claim 1, further comprising transferring one chunk of memory for the at least one of a multi-dimensional array and a multi-level pointer from the central processing unit to the coprocessor over peripheral component interconnect express, the one chunk of memory including all of the variable length elements for all dimensions.

4. The method of claim 3, wherein said transferring step is performed to avoid separately transferring components of the at least one of a multi-dimensional array and a multi-dimensional pointer.

5. The method of claim 1, further comprising:
   parsing and analyzing the memory allocation sites for the given dimension of the at least one of the multi-dimensional array and the multi-dimensional pointer to obtain a memory size of each of elements of the at least one of the multi-dimensional array and the multi-dimensional pointer in the given dimension;
   creating the stride values as only two stride values, a first one of the two stride values being equal to a maximum memory size, and a second one of the two stride values being equal to half of the maximum memory size; and
   labeling each of the elements in the given dimension having the memory size equal to less than half of the maximum memory size as half of the maximum memory size and other ones of the elements as the maximum memory size.

6. The method of claim 5, further comprising, for each respective remaining dimension of the at least one of the multi-dimensional array and the multi-dimensional pointer, using a respective maximum memory size of the respective remaining dimension as a stride value for that respective remaining dimension.

7. The method of claim 1, wherein the first one of the two stride values is stored in a first one of the stride buckets and the second one of the two stride values is stored in a second one of the stride buckets.

8. A source-to-source transformation method for at least one of a multi-dimensional array and a multi-level pointer for a computer program, comprising a transcompiler using static compiler analysis, comprising:
   replacing an original set of memory allocation statements for the at least one of the multi-dimensional array and the multi-level pointer by a single memory allocation statement that allocates a memory region of a given size based on length information parsed from the original set of memory allocation statements;
   resetting pointers, for both a central processing unit and a coprocessor, that retain original memory accesses to the at least one of the multi-dimensional array and the multi-level pointer based on the length information;
   generating pragma offload statements for a data transfer from the processor to the coprocessor over peripheral component interconnect express; and
   transferring an amount of memory for the at least one of the multi-dimensional array and the multi-level pointer, wherein said transferring step is performed to collectively transfer all components of the at least one of a multi-dimensional array and a multi-dimensional pointer.

9. The method of claim 8, wherein said transferring step is performed to avoid separately transferring the components of the at least one of a multi-dimensional array and a multi-dimensional pointer.

10. The method of claim 8, further comprising generating a nested loop to determine a total length of all of the components of the at least one of the multi-dimensional pointer and the multi-level array, wherein the length information comprises the total length.

11. The method of claim 10, wherein each iteration of the nested loop determines a respective length of a respective one of the components for summing to obtain the total length.

12. The method of claim 10, optimizing the data transfer by hoisting the offload statements outside the nested loop to enable data reuse and minimization of data transfer overhead.

13. The method of claim 10, wherein said resetting step comprises generating another nested loop, each iteration of the other nested loop assigning a respective pointer to the memory region.

14. The method of claim 8, further comprising generating a copy of the single memory allocation statement and forwarding the copy to the coprocessor using a pragma offload.

15. The method of claim 8, further comprising generating a _shared clause to support a use of a virtual shared memory for a data structure identified as being incapable of being managed using previous steps of the method.

16. The method of claim 15, further comprising modifying a coherence mechanism of the virtual shared memory to skip recording writes to the virtual shared memory.

17. The method of claim 15, wherein the data structure is one of a graph and a tree.

* * * * *